US007599381B2

(12) United States Patent
Shoham et al.

(10) Patent No.: US 7,599,381 B2
(45) Date of Patent: Oct. 6, 2009

(54) SCHEDULING ELIGIBLE ENTRIES USING AN APPROXIMATED FINISH DELAY IDENTIFIED FOR AN ENTRY BASED ON AN ASSOCIATED SPEED GROUP

(75) Inventors: Doron Shoham, Shoham (IL); Christopher J. Kappler, Waltham, MA (US); Anna Charny, Sudbury, MA (US); Earl T. Cohen, Fremont, CA (US); Robert Olsen, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 702 days.

(21) Appl. No.: 11/022,220

(22) Filed: Dec. 23, 2004

(65) Prior Publication Data

US 2006/0153243 A1    Jul. 13, 2006

(51) Int. Cl.
*H04L 12/56* (2006.01)
*H04L 12/28* (2006.01)
(52) U.S. Cl. .................. 370/413; 370/395.41; 370/392; 370/412; 370/468; 370/503; 709/226; 709/235; 709/240
(58) Field of Classification Search ................. 370/366, 370/232–235, 360, 389–413, 468; 709/200, 709/226, 235, 240; 714/749
See application file for complete search history.

(56) References Cited

U.S. PATENT DOCUMENTS

| 5,625,625 | A * | 4/1997 | Oskouy et al. ........... 370/395.4 |
| 5,864,540 | A | 1/1999 | Bonomi et al. |
| 5,864,557 | A | 1/1999 | Lyons |
| 5,892,766 | A | 4/1999 | Wicki et al. |
| 6,130,878 | A | 10/2000 | Charny |
| 6,337,851 | B1 | 1/2002 | Charny et al. |
| 6,408,005 | B1 | 6/2002 | Fan et al. |
| 6,412,000 | B1 | 6/2002 | Riddle et al. |
| 6,438,134 | B1 | 8/2002 | Chow et al. |
| 6,453,438 | B1 * | 9/2002 | Miller et al. ................ 714/749 |
| 6,483,839 | B1 | 11/2002 | Gemar et al. |
| 6,560,230 | B1 | 5/2003 | Li et al. |

(Continued)

OTHER PUBLICATIONS

"Modular QoS CLI (MQC) Three-Level Hierarchical Policer", Cisco Systems, Inc., San Jose, CA, Oct. 1, 2004.

(Continued)

*Primary Examiner*—Ayaz R Sheikh
*Assistant Examiner*—Venkatesh Haliyur
(74) *Attorney, Agent, or Firm*—The Law Office of Kirk D. Williams

(57) ABSTRACT

Eligible entries are scheduled using an approximated finish delay identified for an entry based on an associated speed group. One implementation maintains schedule entries, each respectively associated with a start time and a speed group. Each speed group is associated with an approximated finish delay. An approximated earliest finishing entry from the eligible schedule entries is determined that has an earliest approximated finish time, with the approximated finish time of an entry being determined based on the entry's start time and the approximated finish delay of the associated speed group. The scheduled action corresponding to the approximated earliest finishing entry is then typically performed. The action performed may, for example, correspond to the forwarding of one or more packets, an amount of processing associated with a process or thread, or any activity associated with an item.

33 Claims, 6 Drawing Sheets

U.S. PATENT DOCUMENTS

| | | | |
|---|---|---|---|
| 6,643,293 B1 | 11/2003 | Carr et al. | |
| 6,683,884 B1* | 1/2004 | Howard | 370/412 |
| 6,691,312 B1 | 2/2004 | Sen et al. | |
| 6,715,046 B1* | 3/2004 | Shoham et al. | 711/158 |
| 6,778,546 B1* | 8/2004 | Epps et al. | 370/413 |
| 6,810,426 B2* | 10/2004 | Mysore et al. | 709/234 |
| 6,836,475 B2 | 12/2004 | Chaskar et al. | |
| 6,859,454 B1* | 2/2005 | Bowes | 370/366 |
| 6,876,952 B1 | 4/2005 | Kappler et al. | |
| 6,937,601 B2* | 8/2005 | Kim | 370/395.41 |
| 6,940,861 B2* | 9/2005 | Liu et al. | 370/395.21 |
| 6,985,442 B1* | 1/2006 | Wang et al. | 370/232 |
| 7,023,840 B2* | 4/2006 | Golla et al. | 370/360 |
| 7,039,013 B2* | 5/2006 | Ruutu et al. | 370/235 |
| 7,065,091 B2* | 6/2006 | Shoham et al. | 370/395.41 |
| 7,110,411 B2* | 9/2006 | Saidi et al. | 370/395.4 |
| 7,212,535 B2* | 5/2007 | Shoham et al. | 370/395.41 |
| 7,216,090 B2* | 5/2007 | LaCroix | 705/14 |
| 7,236,491 B2* | 6/2007 | Tsao et al. | 370/392 |
| 7,324,536 B1* | 1/2008 | Holtey et al. | 370/412 |
| 7,328,231 B2* | 2/2008 | LaCroix et al. | 709/200 |
| 7,349,405 B2* | 3/2008 | Deforche | 370/395.4 |
| 7,350,208 B1* | 3/2008 | Shoham | 718/102 |
| 7,362,762 B2* | 4/2008 | Williams et al. | 370/394 |
| 7,426,215 B2* | 9/2008 | Romano et al. | 370/412 |
| 7,457,313 B2* | 11/2008 | Patrick | 370/468 |
| 2002/0077909 A1* | 6/2002 | Kanojia et al. | 705/14 |
| 2003/0076868 A1* | 4/2003 | Desai et al. | 374/160 |
| 2003/0123449 A1 | 7/2003 | Kuhl et al. | |
| 2003/0179774 A1* | 9/2003 | Saidi et al. | 370/468 |
| 2003/0214964 A1* | 11/2003 | Shoham et al. | 370/412 |
| 2003/0231590 A1* | 12/2003 | Zhao et al. | 370/230.1 |
| 2005/0152374 A1 | 7/2005 | Cohen et al. | |
| 2005/0220112 A1* | 10/2005 | Williams et al. | 370/394 |
| 2006/0029079 A1 | 2/2006 | Cohen et al. | |
| 2006/0029080 A1 | 2/2006 | Kappler et al. | |
| 2006/0114912 A1* | 6/2006 | Kwan et al. | 370/395.4 |

OTHER PUBLICATIONS

U.S. Appl. No. 10/758,547, filed Jan. 14, 2004, Charny et al.
U.S. Appl. No. 10/422,167, filed Apr. 24, 2003, Kappler et al.
U.S. Appl. No. 11/022,246, filed Dec. 23, 2004, Cohen et al.
U.S. Appl. No. 11/070,932, filed Mar. 3, 2005, Kappler et al.
U.S. Appl. No. 10/913,055, filed Aug. 5, 2004, Cohen et al.
Bennett et al., "Hierarchical Packet Fair Queueing Algorithms," IEEE/ACM Transactions on Networking (TON), vol. 5, Issue 5, Oct. 1997, pp. 675-689.
Hou et al., "Service Disciplines for Guaranteed Performance Service," Proceedings—Fourth International Workshop on Real-Time Computing Systems and Applications, Oct. 27-29, 1997, pp. 244-250, Taipei.
Hagai et al., "Multiple Priority, Per Flow, Dual GCRA Rate Controller for ATM Switches," Electrical and Electronic Engineers in Israel, 2000. The 21st IEEE Convention, Apr. 11-12, 2000, pp. 479-482, Tel-Aviv, Israel.
Kim et al., "Three-level Traffic Shaper and its Application to Source Clock Frequency Recovery for VBR Services in ATM Networks," IEEE/ACM Transaction on Networking (TON), vol. 3, Issue 4, Aug. 1995, pp. 450-458.
Dixit et al., "Traffic Descriptor Mapping and Traffic Control for Frame Relay Over ATM Network," IEEE/ACM Transactions on Networking (TON), vol. 6, Issue 1, Feb. 1998, pp. 56-70.
Bennett et al., "WF²Q: Worst-case Fair Weighted Fair Queueing," INFOCOM '96. Fifteenth Annual Joint Conference of the IEEE Computer Societies Networking the Next Generation. Proceedings IEEE. Mar. 24-28, 1996, vol. 1, pp. 120-128.
Bennett et al., "High-Speed, Scalable, and Accurate Implementation of Fair Queueing Algorithms in ATM Networks," ICNP '97, http://www-2.cs.cmu.edu/~hzhang/papers/ICNP97.pdf, 1997.

* cited by examiner

EXEMPLARY
SPEED
GROUPS
400

```
Group 0: rates between 1       and 1/8th    of peak
Group 1: rates between 1/8th   and 1/16th   of peak
Group 2: rates between 1/16th  and 1/32nd   of peak
Group 3: rates between 1/32nd  and 1/64th   of peak
Group 4: rates between 1/64th  and 1/128th  of peak
Group 5: rates between 1/128th and 1/256th  of peak
Group 6: rates between 1/256th and 1/512th  of peak
Group 7: rates between 1/512th and 1/1024th of peak
Group 8: rates between 1/1024th and 1/2048th of peak
Group 9: rates between 1/2048th and 1/4096th of peak
```

EXEMPLARY
SPEED
GROUPS
401

```
Group 0: rates between 1       and 1/6th     of peak
Group 1: rates between 1/6th   and 1/13th    of peak
Group 2: rates between 1/13th  and 1/27th    of peak
Group 3: rates between 1/27th  and 1/56th    of peak
Group 4: rates between 1/56th  and 1/115th   of peak
Group 5: rates between 1/115th and 1/235th   of peak
Group 6: rates between 1/235th and 1/481st   of peak
Group 7: rates between 1/481st and 1/983rd   of peak
Group 8: rates between 1/983rd and 1/2008th  of peak
Group 9: rates between 1/2008th and 1/4102nd of peak
```

FIGURE 4

SCHEDULING ELIGIBLE ENTRIES USING AN APPROXIMATED FINISH DELAY IDENTIFIED FOR AN ENTRY BASED ON AN ASSOCIATED SPEED GROUP

TECHNICAL FIELD

One embodiment of the invention relates to communications and computer systems, especially routers, packet switching systems, and other devices; and more particularly, one embodiment relates to scheduling eligible entries using an approximated finish delay identified for an entry based on an associated speed group.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and forwards or discards a packet. For example, an enqueuing component of such a device receives a stream of various sized packets which are accumulated in an input buffer. Each packet is analyzed, and an appropriate amount of memory space is allocated to store the packet. The packet is stored in memory, while certain attributes (e.g., destination information and other information typically derived from a packet header or other source) are maintained in separate memory. Once the entire packet is written into memory, the packet becomes eligible for processing, and an indicator of the packet is typically placed in an appropriate destination queue for being serviced according to some scheduling methodology.

When there is a contention for resources, such as on output links of a packet switching system or interface or even for compute cycles in a computing device, it is important for resources to be allocated or scheduled according to some priority and/or fairness policy. Moreover, the amount of work required to schedule and to enqueue and dequeue a packet or other scheduled item is important, especially as the operating rate of systems increase. Many different mechanisms have been used by an individual schedule to schedule packets, many of which are described hereinafter.

Ordinary time division multiplexing (TDM) is a method commonly used for sharing a common resource between several clients. All scheduled clients are served one at a time at predetermined times and for pre-allocated time periods, which is a very useful property for many applications. This method is often used for multiplexing multiple synchronous items over a higher speed communications link, such as that used for multiplexing multiple telephone calls over a single facility or interleaving packets. However, in a dynamic environment wherein items may not require the full amount of their allocated time slot such as when an item may only require none or only a portion of a particular allocated time slot, then bandwidth of the resource is typically wasted.

Ordinary round-robin (RR) is another method commonly used for sharing a common resource between several clients. All clients are served in a cyclic order. In each round every client will be served if it is eligible. When served, each client is permitted to send one packet. Servicing of queues is simple to implement and can be done in constant time, but, due to the varying size of packets, does not allocate bandwidth fairly. For example, certain higher priority or larger bandwidth ports or streams of packets may not get their desired amount of bandwidth, which may especially be the case when serving one large and numerous smaller traffic streams or when different priorities of traffic are scheduled.

In some scenarios, high priority (e.g., low latency), guaranteed bandwidth, best effort traffic (e.g., spare bandwidth) and other classifications of traffic compete for a common resource. Various known scheduling methods are designed to provide isolation, prioritization, and fair bandwidth allocation to traffic competing for a common resource. These are known as fair queuing methods. Some examples are Weighted Fair Queuing (WFQ), Self-Clocked Fair Queuing (SCFQ), and Deficit Round Robin/Surplus Round Robin (referred to as DRR).

WFQ and SCFQ depend upon arrival times as well as previous link utilization in order to calculate the next best packet to send. The accepted "ideal" behavior is bit-by-bit or weighted bit-by-bit round robin which assigns each bit of each packet in the system an ideal finish time according to the weighted fair sharing of the system. This is typically not practical in a packet-based system unless all packets are one bit. Generalizing the algorithm from bit-by-bit to packet-by-packet, each packet is assigned an ideal finish (departure) time and the packets are served in order of the earliest departure time. The inclusion of theoretical departure times in a scheduling method typically requires insertion into a sorted list which is known to be an O(log N) problem implemented in software, where N is typically the number of queues. In hardware, this problem may be reduced to an O(1) operation with O(log N) resources.

DRR is a method used for sharing a common resource between several clients with different ratios between clients (i.e., some clients are allowed to consume more of the resources than others). The ratio between clients is typically defined by a parameter called a quantum. There are many variations and different implementations of DRR, including that described hereinafter.

DRR services queues using round-robin servicing with a quantum assigned to each queue. Unlike traditional round-robin, multiple packets up to the specified quantum can be sent resulting in each queue sending at least a quantum's worth of bytes. If the quantum for each queue is equal, then each queue will consume an equal amount of bandwidth.

This DRR approach works in rounds, where a round is one round-robin iteration over the queues that have items to be sent. Typically, when the queue is scheduled, it is allowed to transmit until its deficit becomes negative (or non-positive), and then the next queue is served. Packets coming in on different flows are stored in different queues. Each round, each queue is allocated a quantum worth of bytes, which are added to the deficit of each queue. Each queue is allowed to send out one or more packets in a DRR round, with the exact number of packets being sent in a round being dependent on its quantum and the size of the packets being sent. Typically, as long as the deficit is a positive (or non-negative) value (i.e., it is authorized to send a packet) in a DRR round for a queue and it has one or more packets to send, a packet is sent and its deficit is reduced based on the size of the sent packet. If there are no more packets in a queue after the queue has been serviced, one implementation sets the deficit corresponding to the queue to zero, while one implementation does this only if its deficit is negative. Otherwise, the remaining amount (i.e., the deficit minus the number of bytes sent) is maintained for the next DRR round.

DRR has a complexity of O(1)—that is the amount of work required is a constant and independent of the number of packets enqueued. In order to be work conserving, a packet should be sent every time a queue is scheduled no matter its size. Thus, the quantum used in DRR should be at least one maximum packet size (MTU) to guarantee that when the quantum is added to any deficit, the resulting value is at least zero. DRR provides fair bandwidth allocation and is easy to implement. It is work conserving and, because of its O(1) properties, it scales well with higher link speeds and larger number of queues. However, its scheduling behavior deviates quite a bit from the bit-by-bit round robin "ideal." In particular, latency for a system with N queues is Q*N where Q is the average quantum, which must be at least one maximum transmission unit (MTU).

These scheduling techniques can work well for scheduling a single layer of service or traffic. However, bandwidth is being sold to end customers based on types and aggregation of traffic. For example, customers might subscribe to certain types of traffic with different delay and bandwidth requirements, such as voice, video, gaming, email, instant messaging, and Internet browsing. Some of these traffic types can be very time and delay sensitive, while other types of traffic can be serviced using a best effort without too much impact on the service. Thus, service providers may be able to sell a premium service which provides a minimum guaranteed service rate for specific one or more types of traffic, while providing best effort service for its remaining types of traffic. Additionally, this traffic may be aggregated into digital subscriber line (DSL) or virtual LAN (VLAN) services, which typically have their own service requirements, especially including maximum subscribed rates. If a policer function is used to limit one or more traffic rates, then packets are typically dropped or service backpressured. However, indiscriminate dropping of packets or throttling of all types of traffic can especially impact services which are delay and bandwidth sensitive (e.g., voice and video services). Needed are new ways to accommodate different types and aggregations of traffic.

SUMMARY

Disclosed are, inter alia, methods, apparatus, data structures, computer-readable media, and mechanisms for scheduling eligible entries using an approximated finish delay identified for an entry based on an associated speed group. One embodiment maintains schedule entries, each respectively associated with a start time and a speed group. Each speed group is associated with an approximated finish delay. An approximated earliest finishing entry from the eligible schedule entries is determined that has an earliest approximated finish time, with the approximated finish time of an entry being determined based on the entry's start time and the approximated finish delay of the associated speed group. The scheduled action corresponding to the approximated earliest finishing entry is then typically performed in response to the determination of which entry is the approximated earliest finishing entry from the eligible schedule entries. The action performed may, for example, correspond to the forwarding of one or more packets, an amount of processing associated with a process or thread, or any activity associated with an item.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 4 is a block diagram illustrating a set of speed groups used in one embodiment;

DETAILED DESCRIPTION

Figure 1:
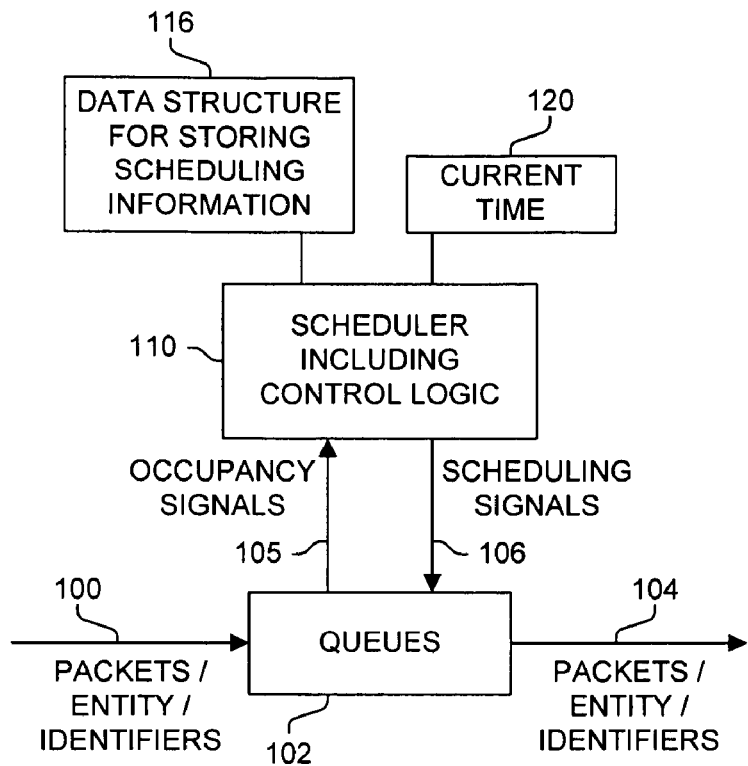
FIG. 1 is a block diagram of an exemplary scheduler used in one embodiment.

Disclosed are, inter alia, methods, apparatus, data structures, computer-readable media, and mechanisms for scheduling eligible entries using an approximated finish delay identified for an entry based on an associated speed group.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to, all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, and mechanisms for scheduling eligible entries using an approximated finish delay identified for an entry based on an associated speed group. One embodiment maintains schedule entries, each respectively associated with a start time and a speed group. Each speed group is associated with an approximated finish delay. An approximated earliest finishing entry from the eligible schedule entries is determined that has an earliest approximated finish time, with the approximated finish time of an entry being determined based on the entry's start time and the approximated finish delay of the associated speed group. The scheduled action corresponding to the approximated earliest finishing entry is then typically performed in response to the determination of which entry is the approximated earliest finishing entry from the eligible schedule entries. The action performed may, for example, correspond to the forwarding of one or more packets, an amount of processing associated with a process or thread, or any activity associated with an item.

One embodiment updates the start time of the approximated earliest finishing entry based on an amount corresponding to the action. In one embodiment, the action corresponds to the sending of a packet; and wherein updating the start time includes adjusting (e.g., typically increasing) the start time of the approximated earliest finishing entry by an amount corresponding to the size of the packet and a rate associated with the approximated earliest finishing entry. In one embodiment, the amount is different than the approximated finish delay associated with the speed group associated with the approximated earliest finishing entry. One embodiment determines the subset of the schedule entries that are currently eligible based on their respective said start times in relation to a current scheduling time. In one embodiment, each of the speed groups has at least two items with different associated rates within a respective range of scheduling rates. In one embodiment, the range of scheduling rates of each of the speed groups is a same size. In one embodiment, the range of scheduling rates of each of the speed groups is not of a same size. In one embodiment, the range of scheduling rates of the speed groups are non-overlapping.

In one embodiment, the approximated finish delay of each particular speed group is determined based on a maximum time required for an action corresponding to the schedule entries associated with the particular speed group to be performed. In one embodiment, the approximated finish delay of each particular speed group is determined based on a minimum time required for an action corresponding to the schedule entries associated with the particular speed group to be performed. In one embodiment, the approximated finish delay of each particular speed group is determined based on an average time required for an action corresponding to the schedule entries associated with the particular speed group to be performed. In one embodiment, some other size and/or rate is used to determine the approximated finish delay of a speed group. Also, in one embodiment, the speed groups and/or approximated finish delays associated therewith are static, while in one embodiment they are dynamic (e.g., updated periodically or otherwise). In one embodiment, speed groups may be assigned priorities, wherein typically a highest priority, eligible speed group gets serviced first.

One embodiment includes one or more scheduling data structures and a scheduling mechanism. The one or more scheduling data structures associate the schedule entries with a start time and a speed group. Each speed group is associated with an approximated finish delay. The scheduling mechanism is configured to identify an approximated earliest finishing entry from the subset of schedule entries that are currently eligible, with the approximated earliest finishing entry having an earliest approximated finish time of the eligible schedule entries with each approximated finish time being determined based on an entry's respective start time and the approximated finish delay of the associated speed group.

In one embodiment, the scheduling mechanism is configured to update the start time of the approximated earliest finishing entry based on an amount corresponding to an action associated with the approximated earliest finishing entry. In one embodiment, the action corresponds to the sending of a packet; and wherein updating the start time of the approximated earliest finishing entry based on the action includes increasing the start time of the approximated earliest finishing entry by an amount corresponding to the size of the packet and a rate associated with the approximated earliest finishing entry. In one embodiment, the amount is different than the approximated finish delay associated with the speed group associated with the approximated earliest finishing entry. In one embodiment, the approximated finish delay of each particular speed group of the speed groups is determined based on a maximum time required for an action corresponding to the schedule entries associated with the particular speed group to be performed. In one embodiment, the approximated finish delay of each particular speed group of the speed groups is determined based on a maximum time required for an action corresponding to the schedule entries associated with the particular speed group to be performed.

In one embodiment, each action corresponding to a schedule entry corresponds to the sending of a packet, and the approximated finish delay of each particular speed group of the speed groups is determined based on a largest packet size and a rate within a range of scheduling rates of the particular speed group. In one embodiment, the rate is one of the boundary rates of the range of scheduling rates of the particular speed group. In one embodiment, the rate is the fastest of the boundary rates of the range of scheduling rates of the particular speed group. In one embodiment, the rate is the slowest of the boundary rates of the range of scheduling rates of the particular speed group.

FIG. 1 illustrates one embodiment of a system such as, but not limited to a computer or communications system, which schedules eligible entries using an approximated finish delay identified for an entry based on an associated speed group. As shown, packets or other items or identifiers thereof 100 to be scheduled are received from one or more interfaces, processes, threads, information streams, or other sources. These items 100 are typically stored in queues 102 for scheduling by scheduler 110. In one embodiment, such as that of processing packets or communication streams, scheduler 110 processes one or more streams of items 100 to produce one or more streams of items 104 according to the scheduling mechanism.

Scheduler 110, which typically includes control logic, typically receives occupancy signals 105 from queues 102 or from another source, and generates scheduling signals 106 indicating which packets or other items to process at what time or in what order and possibly including a quantitative amount, such as a number of packets or bytes to send or process. Scheduler 110 typically uses a memory 116 for maintaining scheduling information. In one embodiment, scheduler 110 is hardwired to perform the scheduling functions. In one embodiment, scheduler 110 includes a processing element responsive to stored instructions. Scheduler 110 typically is responsive to a clock or counter indication of a current time 120, which may be a real or virtual time, and may possibly be updated autonomously or by the scheduler.

Figure 2:
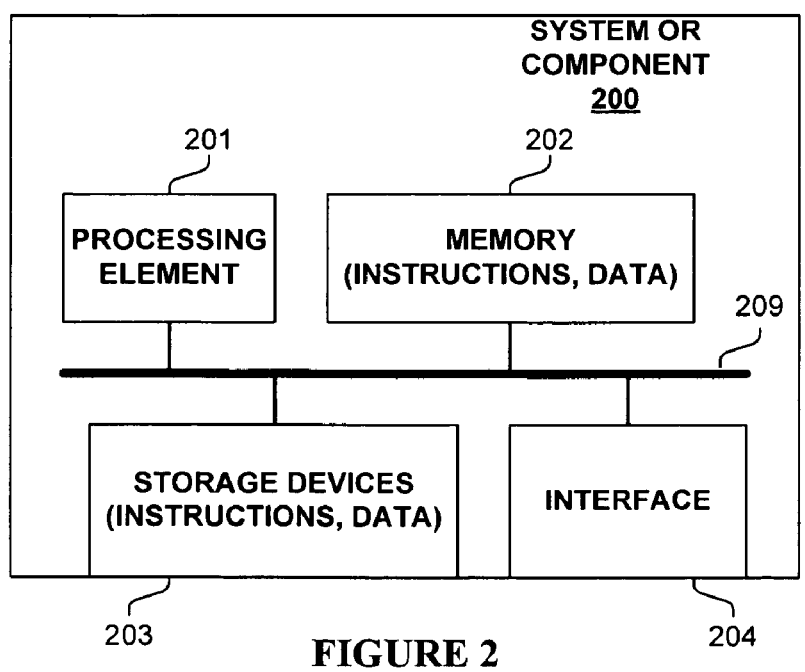
FIG. 2 is a block diagram of an exemplary scheduler used in one embodiment.

FIG. 2 is a block diagram of an exemplary system or component 200 used in one embodiment of a scheduler which schedules eligible entries using an approximated finish delay identified for an entry based on an associated speed group. In one embodiment, system or component 200 performs one or more processes corresponding to one of the flow diagrams illustrated or otherwise described herein.

In one embodiment, component 200 includes a processing element 201 (e.g., a processor, customized logic, etc.), memory 202, storage devices 203, and an interface 204 for receiving and sending packets, items, and/or other information, which are typically coupled via one or more communications mechanisms 209 (shown as a bus for illustrative purposes.) Various embodiments of component 200 may include more or less elements. The operation of component 200 is typically controlled by processing element 201 using memory 202 and storage devices 203 to perform one or more scheduling tasks or processes. Memory 202 is one type of computer-readable medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with the invention. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with the invention.

Figure 3A:
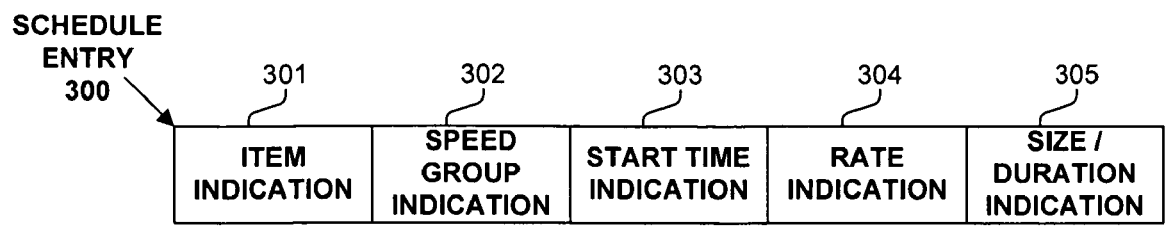
FIG. 3A is a block diagram of a schedule entry used in one embodiment.

FIG. 3A is a block diagram of a schedule entry used in one embodiment. Although an unlimited number of variations are possibly used in various embodiments, schedule entry 300 typically includes an item indication 301 (e.g., packet handle, item reference number, etc.) referencing the item being scheduled, and a speed group indication 302 indicating with which speed group the scheduling entry is associated or the actual approximated finish delay of the associated speed group. In one embodiment, a scheduling entry 300 also includes a scheduling start time indication 303. In one embodiment, this start time is inferred based on a position in a calendar or other scheduling mechanism. In one embodiment, a scheduling entry 300 also includes a rate indication 304 and/or size/duration indication 305. In one embodiment, the rate indication and/or size/duration indication are stored in another data structure. For example, in one embodiment, a packet handle contains a reference to a queue and an amount of how much data can be removed from that queue for this packet/burst.

Figure 3B:
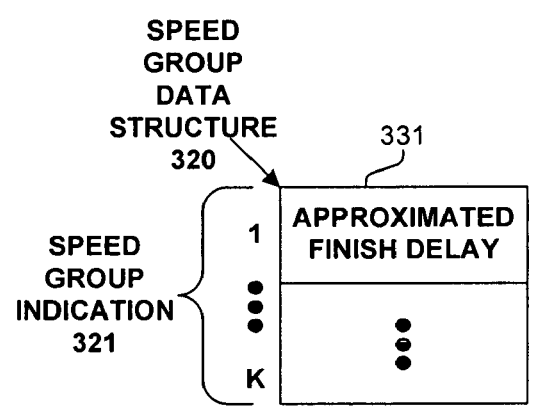
FIG. 3B is a block diagram of a speed group data structure used in one embodiment.
Figure 3C:
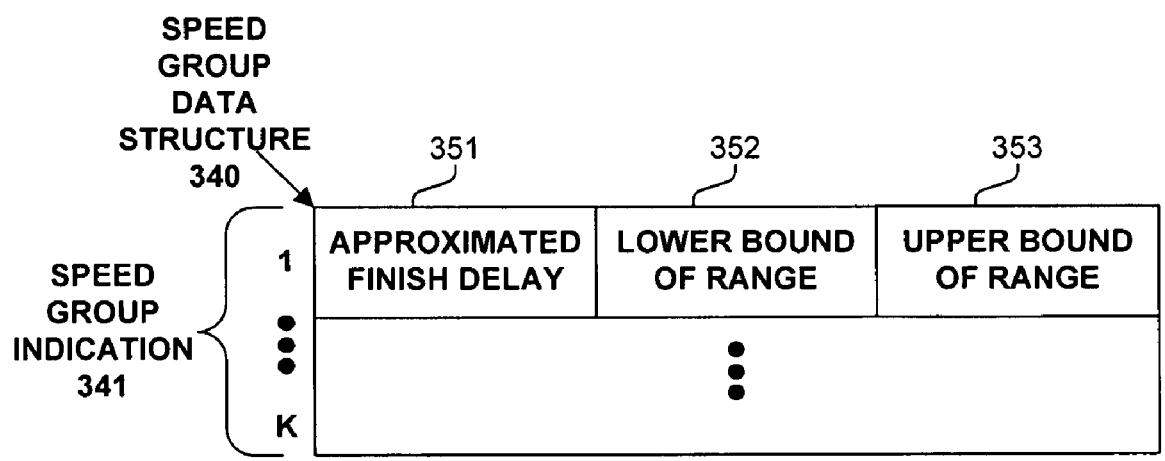
FIG. 3C is a block diagram of a speed group data structure used in one embodiment.

Typically, to save storage space, speed group indication 302 is a reference into a data structure, such as speed group data structure 320 of FIG. 3B or speed group data structure 340 of FIG. 3C, for identifying the approximated finish delay associated with each of the speed groups.

As shown in FIG. 3B, speed group data structure 320 includes multiple entries each referenced by a speed group indication 321 to identify the corresponding approximated finish delay 331 for each speed group. In one embodiment, each speed group entry also includes one or more indications to identify a set of rates, one or more ranges of rates, or some other value or values associated therewith, typically for ease of identifying to which speed group a scheduling entry belongs. In one embodiment, the number of speed groups is fixed. In one embodiment, the number of speed groups is variable. In one embodiment, the values of the approximated finish delays are preprogrammed and static. In one embodiment, the values of the approximated finish delays are variable, and may be changed during the operation of an embodiment.

This approximated finish delay is an amount used for each scheduling entry in a speed group to approximate its completion time, typically by adding the approximated finish delay to its start time (or otherwise adjusting its start time based on the approximated finish delay). It is possible to determine a more accurate finish time for each scheduling entry, such as by multiplying its corresponding rate by its corresponding size or duration thus typically producing a slightly different finish time, but such computations for each scheduling entry require additional computing and/or storage resources, and furthermore, requires knowing the size of the entry prior to determining its (approximate) finish time which is typically known at a later time causing a time delay per transit event and a lower repetition rate.

FIG. 3C illustrates a speed group data structure 340 used in one embodiment. As shown, speed group data structure 340 includes multiple entries each referenced by a speed group indication 341 to identify the corresponding approximated finish delay 351 for each speed group. In one embodiment, each speed group entry also includes one or more indications, such as the lower and upper bounds 352-353 of the speed group or some other value or values, for ease of identifying to which speed group a scheduling entry belongs. In one embodiment, a set of rates is identified in speed group data structure 340 for each speed group (e.g., each speed group may or may not correspond to a contiguous range of rates). In one embodiment, this speed group categorization information is stored in another data structure. In one embodiment, size/duration indication 305 of FIG. 3A is part of item indication 301. For example, in one embodiment, a packet handle contains a reference to a queue and an amount of how much data can be removed from that queue for this packet/burst.

The speed groups used by a scheduler are typically determined based on the application of the scheduler. In one embodiment, the speed groups are non-overlapping. In one embodiment, the speed groups are overlapping. In one embodiment, all speed group are of a same size (e.g., are linear); while in one embodiment they are not all of a same size.

The approximated finish delay associated with a particular speed group can be an average, minimum, maximum, or other duration that an item associated therewith approximately takes to complete. For example, one embodiment that schedules packet uses as its approximated finish delay the size of a maximum-sized packet divided by the slowest rate (e.g., lower bound) of the speed group. In one embodiment, the approximated finish delay of each particular speed group is determined based on a maximum time required for an action corresponding to the schedule entries associated with the particular speed group to be performed. In one embodiment, the approximated finish delay of each particular speed group is determined based on a minimum time required for an action corresponding to the schedule entries associated with the particular speed group to be performed. In one embodiment, the approximated finish delay of each particular speed group is determined based on an average time required for an action corresponding to the schedule entries associated with the particular speed group to be performed. In one embodiment, some other size and/or rate is used to determine the approximated finish delay of a speed group. Also, in one embodiment, the speed groups and/or approximated finish delays associated therewith are static, while in one embodiment they are dynamic (e.g., updated periodically or otherwise).

FIG. 4 illustrates an exemplary set of speed groups 400. Shown are ten speed groups and their corresponding ranges. The determination of the number of speed groups and range of each speed group is typically made in consideration of the application of the scheduler, and the types and characteristics of items being scheduled. Simulation may be employed to aid in such determinations. Also, a system might automatically adjust the speed groups and/or the approximated finish delay of one or more speed groups based on information acquired during its operation, or based on preprogrammed instructions.

Figure 5:
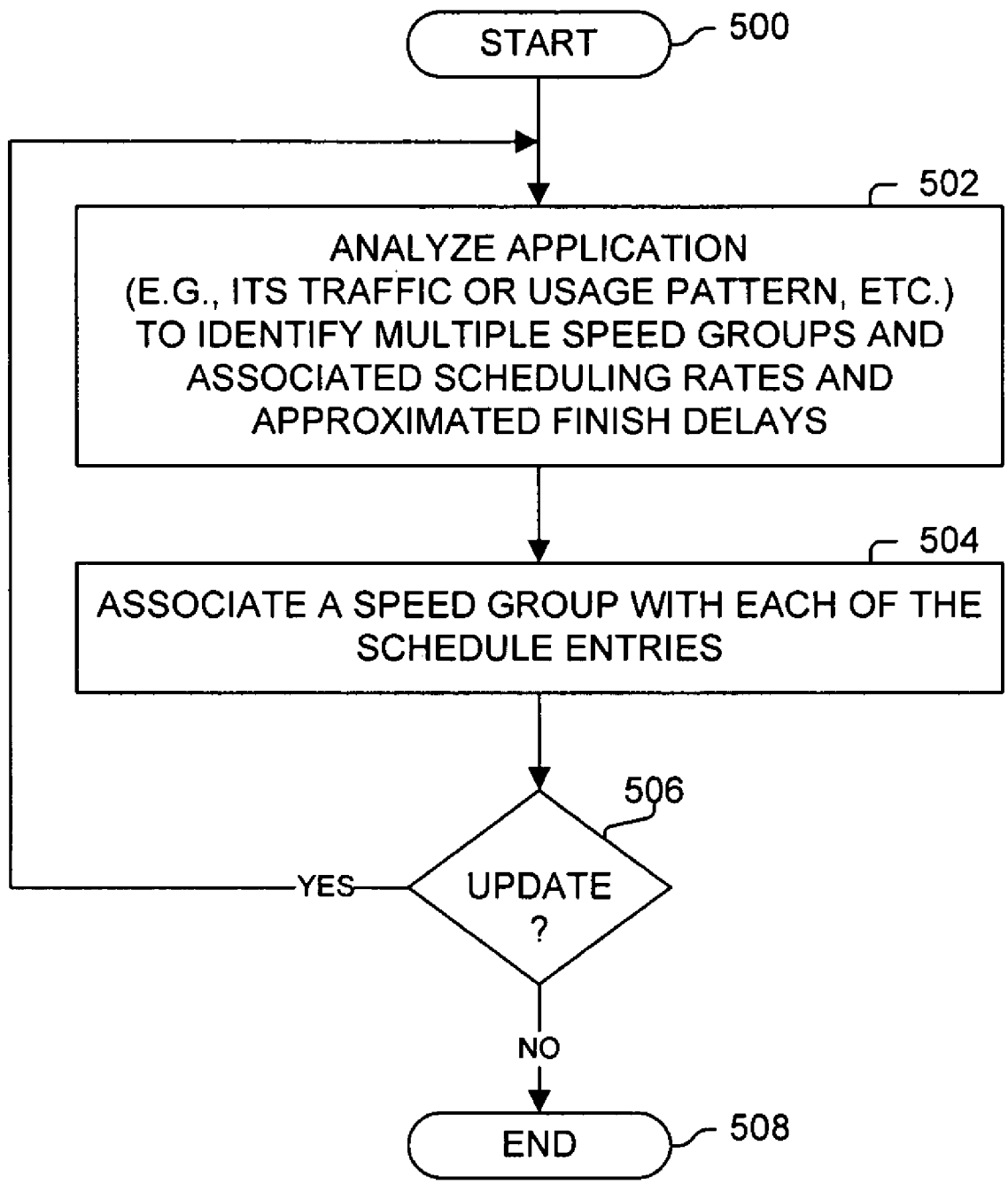
FIG. 5 is a flow diagram illustrating a process used in one embodiment for identifying speed groups.

FIG. 5 is a flow diagram illustrating a process used in one embodiment for identifying speed groups. Processing begins with process block 500, and proceeds to process block 502, wherein the application (e.g., scheduling of packets, processes, threads, or other items and their traffic and/or usage pattern characteristics, etc.) being scheduled is analyzed to identify multiple speed groups and their approximated finish delays. In process block 504, a speed group is associated with each of the schedule entries. As determined in process block 506, possibly after some fixed or variable delay, if an update of the speed groups (e.g., the number of speed groups, their associated ranges or sets of rates, and/or approximated finish delays) is to be performed, then processing proceeds to process block 502. Otherwise, processing is complete as indicated by process block 508.

Figure 6:
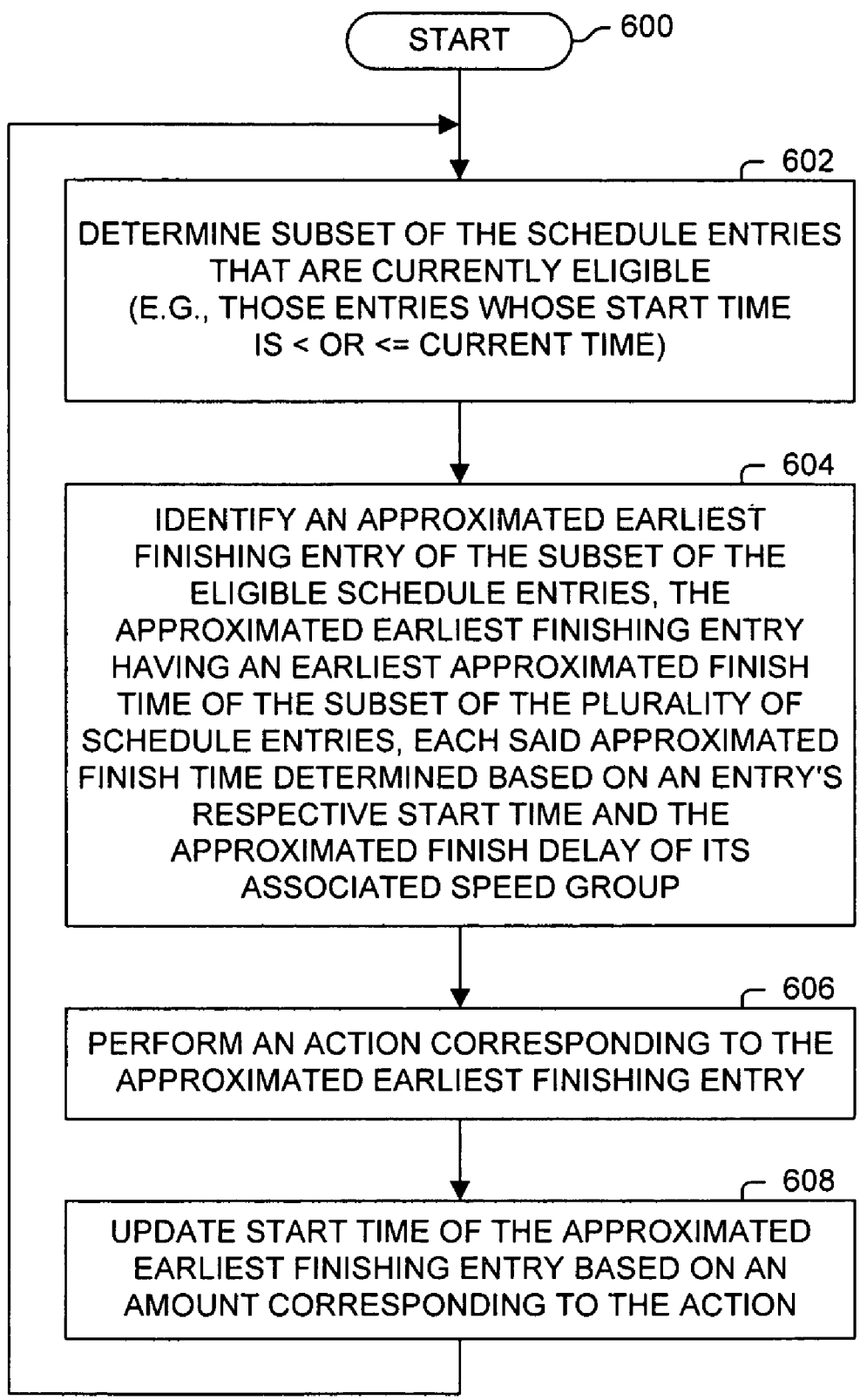
FIG. 6 is a flow diagram illustrating a process used in one embodiment for scheduling eligible entries using an approximated finish delay identified for an entry based on an associated speed group.

FIG. 6 is a flow diagram illustrating a process used in one embodiment for scheduling eligible entries using an approximated finish delay identified for an entry based on an associated speed group. Processing begins with process block 600, and proceeds to process block 602, wherein a subset of eligible schedule entries is determined, such as, but not limited to an identification of those entries whose start time is less than, or less than or equal to, the current time. In one embodiment, the set of eligible entries is further determined based on flow control, link or process status, queue occupancies, and/or other traffic, status, or throttling information.

In process block 604, an approximated earliest finishing entry of the subset of the eligible schedule entries is determined. The approximated earliest finishing entry has an earliest approximated finish time of those eligible schedule entries, with each approximated finish time determined based on an entry's respective start time and the approximated finish delay of the associated speed group (e.g., by adding these two values together). Many different scheduling mechanisms may be employed by an embodiment to help with this identification, such as, but not limited to calendars, sorting trees and/or any other scheduling mechanism.

In process block 606, an action corresponding to the approximated earliest finishing entry is performed; and in process block 608, the start time of the approximated earliest finishing entry is updated based on an amount corresponding to the action performed. For example, if the action is sending a packet, then the start time is typically updated by the result of the length of the packet times its actual scheduling rate (and typically not by the approximated finish time of the associated speed group which typically would produce a different next start time). Processing then returns to process block 602.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for scheduling using hardware control logic or one or more processor elements, the method comprising:
    (a) maintaining a plurality of schedule entries in one or more tangible computer-readable media, with each of the plurality of schedule entries respectively associated with a start time and a speed group of a plurality of speed groups, with each said speed group associated with a time value representing a single predetermined approximated finish delay for use in scheduling each scheduling entry associated with the corresponding said speed group, and with each of the plurality of speed groups representing a respective range of at least two different scheduling rates;
    (b) identifying an approximated earliest finishing entry of a subset of the plurality of schedule entries that are currently eligible, the approximated earliest finishing entry having an earliest approximated finish time of the subset of the plurality of schedule entries, each said approximated finish time determined based on an entry's respective said start time and said approximated finish delay of its associated said speed group;
    (c) initiating an action corresponding to the approximated earliest finishing entry in response to said identifying the approximated earliest finishing entry; and
    (d) updating said start time of the approximated earliest finishing entry based on an amount corresponding to the action.

2. The method of claim 1, wherein the action corresponds to the sending of a packet; and wherein said updating said start time of the approximated earliest finishing entry based on the action includes adjusting said start time of the approximated earliest finishing entry by an amount corresponding to the size of the packet and a rate associated with the approximated earliest finishing entry.

3. The method of claim 1, wherein the amount is different than said approximated finish delay associated with said speed group associated with the approximated earliest finishing entry.

4. The method of claim 1, wherein said steps (b)-(d) are repeatedly performed a plurality of times without repeating step (a).

5. The method of claim 1, comprising determining the subset of the plurality of schedule entries that are currently eligible based on their respective said start times in relation to a current scheduling time.

6. The method of claim 1, wherein said range of scheduling rates of each of the plurality of speed groups is a same size.

7. The method of claim 1, wherein said range of scheduling rates of each of the plurality of speed groups is not of a same size.

8. The method of claim 1, wherein the approximated finish delay of each particular speed group of the plurality of speed groups is determined based on a maximum time required for an action corresponding to said schedule entries associated with said particular speed group to be performed.

9. The method of claim 1, wherein the approximated finish delay of each particular speed group of the plurality of speed groups is determined based on a minimum time required for an action corresponding to said schedule entries associated with said particular speed group to be performed.

10. The method of claim 1, wherein the approximated finish delay of each particular speed group of the plurality of speed groups is determined based on an average time required for an action corresponding to said schedule entries associated with said particular speed group to be performed.

11. The method of claim 1, wherein each of said schedule entries corresponds to an action of forwarding of a packet, and the approximated finish delay of each particular speed group of the plurality of speed groups is determined based on a largest packet size and a rate within said range of scheduling rates of said particular speed group.

12. The method of claim 11, wherein the rate is one of the boundary rates of said range of scheduling rates of said particular speed group.

13. The method of claim 11, wherein the rate is the fastest of the boundary rates of said range of scheduling rates of said particular speed group.

14. The method of claim 11, wherein the rate is the slowest of the boundary rates of said range of scheduling rates of said particular speed group.

15. The method of claim 1, wherein each of the plurality of schedule entries corresponds to an action of forwarding a packet.

16. The method of claim 1, wherein each of the plurality of schedule entries corresponds to a processing amount for a process or thread.

17. An apparatus for scheduling, the apparatus comprising:
one or more scheduling data structures stored in one or more tangible computer-readable media associating each of a plurality of schedule entries with a respective start time and a speed group of a plurality of speed groups, with each said speed group being associated with a time value representing a single predetermined approximated finish delay for use in scheduling each scheduling entry associated with the corresponding said speed group, with a plurality of said speed groups representing a respective range of at least two different rates; and
a scheduling mechanism configured to identify an approximated earliest finishing entry of a subset of the plurality of schedule entries that are currently eligible and to initiate an action corresponding to said identified earliest finishing entry, the approximated earliest finishing entry having an earliest approximated finish time of the subset of the plurality of schedule entries, each said approximated finish time being determined based on an entry's respective said start time and said approximated finish delay of its associated said speed group.

18. The apparatus of claim 17, wherein the scheduling mechanism is configured to update said start time of the approximated earliest finishing entry based on an amount corresponding to the action associated with the approximated earliest finishing entry.

19. The apparatus of claim 18, wherein the action corresponds to the sending of a packet; and wherein said updating said start time of the approximated earliest finishing entry based on the action includes adjusting said start time of the approximated earliest finishing entry by an amount corresponding to the size of the packet and a rate associated with the approximated earliest finishing entry.

20. The apparatus of claim 18, wherein the amount is different than said approximated finish delay associated with said speed group associated with the approximated earliest finishing entry.

21. The apparatus of claim 17, wherein each of said schedule entries corresponds to the action of forwarding of a packet, and the approximated finish delay of each particular speed group of the plurality of speed groups is determined based on a largest packet size and a rate within said respective range of at least two different rates of said particular speed group.

22. One or more tangible computer-readable media containing computer-executable instructions for performing steps when executed by control logic or one or more processing elements, said steps comprising:
maintaining a plurality of schedule entries, with each of the plurality of schedule entries respectively associated with a start time and a speed group of a plurality of speed groups, with each said speed group representing a range of at least two different scheduling rates and associated with a time value representing a single predetermined approximated finish delay for use in scheduling each scheduling entry associated with the corresponding said speed group; and
identifying an approximated earliest finishing entry of a subset of the plurality of schedule entries that are currently eligible, the approximated earliest finishing entry having an earliest approximated finish time of the subset of the plurality of schedule entries, each said approximated finish time determined based on an entry's respective said start time and said approximated finish delay of its associated said speed group;
initiating an action corresponding to the approximated earliest finishing entry in response to said identifying the approximated earliest finishing entry; and
updating said start time of the approximated earliest finishing entry based on an amount corresponding to the action.

23. The computer-readable media of claim 22, wherein the action corresponds to the sending of a packet; and wherein said updating said start time of the approximated earliest finishing entry based on the amount corresponding to the action includes increasing said start time of the approximated earliest finishing entry by an amount corresponding to the size of the packet and a rate associated with the approximated earliest finishing entry.

24. The computer-readable media of claim 22, wherein the approximated finish delay of each particular speed group of the plurality of speed groups is determined based on a maximum, minimum, or average time required for an action corresponding to said schedule entries associated with said particular speed group to be performed.

25. An apparatus for scheduling, the apparatus comprising:
means for maintaining a plurality of schedule entries in one or more tangible computer-readable media, with each of the plurality of schedule entries respectively associated with a start time and a speed group of a plurality of speed groups, with each said speed group associated with a time value representing a single predetermined approximated finish delay for use in scheduling each scheduling entry associated with the corresponding said speed group, and with each of the plurality of speed groups representing a respective range of at least two different scheduling rates; and
means for identifying an approximated earliest finishing entry of a subset of the plurality of schedule entries that are currently eligible and to initiate an action corresponding to said identified earliest finishing entry, the approximated earliest finishing entry having an earliest approximated finish time of the subset of the plurality of schedule entries, each said approximated finish time determined based on an entry's respective said start time and said approximated finish delay of its associated said speed group.

26. The apparatus of claim 25, comprising updating said start time of the approximated earliest finishing entry based on an amount corresponding to the action associated with the approximated earliest finishing entry.

27. The apparatus of claim 26, wherein the action corresponds to the sending of a packet; and wherein said updating said start time of the approximated earliest finishing entry based on the action includes increasing said start time of the approximated earliest finishing entry by an amount corresponding to the size of the packet and a rate associated with the approximated earliest finishing entry.

28. A method for scheduling by a particular machine, the method comprising:
(a) maintaining a plurality of schedule entries, each of the plurality of schedule entries respectively associated with a start time and a speed group of a plurality of speed groups, each said speed group associated with an approximated finish delay; and
(b) identifying an approximated earliest finishing entry of a subset of the plurality of schedule entries that are currently eligible, the approximated earliest finishing entry having an earliest approximated finish time of the subset of the plurality of schedule entries, each said approximated finish time determined based on an entry's respective said start time and said approximated finish delay of its associated said speed group;
wherein each of the plurality of speed groups is associated with a respective range of scheduling rates; and wherein each of said schedule entries corresponds to an action of forwarding of a packet by the particular machine, and the approximated finish delay of each particular speed group of the plurality of speed groups is determined based on a largest packet size and a rate within said range of scheduling rates of said particular speed group; and
wherein the rate is one of the boundary rates of said range of scheduling rates of said particular speed group.

29. A method for scheduling by a particular machine, the method comprising:
(a) maintaining a plurality of schedule entries, each of the plurality of schedule entries respectively associated with a start time and a speed group of a plurality of speed groups, each said speed group associated with an approximated finish delay; and
(b) identifying an approximated earliest finishing entry of a subset of the plurality of schedule entries that are currently eligible, the approximated earliest finishing entry having an earliest approximated finish time of the subset of the plurality of schedule entries, each said approximated finish time determined based on an entry's respective said start time and said approximated finish delay of its associated said speed group;
wherein each of the plurality of speed groups is associated with a respective range of scheduling rates; and wherein each of said schedule entries corresponds to an action of forwarding of a packet by the particular machine, and the approximated finish delay of each particular speed group of the plurality of speed groups is determined based on a largest packet size and a rate within said range of scheduling rates of said particular speed group; and
wherein the rate is the fastest of the boundary rates of said range of scheduling rates of said particular speed group.

30. A method for scheduling by a particular machine, the method comprising:
(a) maintaining a plurality of schedule entries, each of the plurality of schedule entries respectively associated with a start time and a speed group of a plurality of speed groups, each said speed group associated with an approximated finish delay; and
(b) identifying an approximated earliest finishing entry of a subset of the plurality of schedule entries that are currently eligible, the approximated earliest finishing entry having an earliest approximated finish time of the subset of the plurality of schedule entries, each said approximated finish time determined based on an entry's respective said start time and said approximated finish delay of its associated said speed group;
wherein each of the plurality of speed groups is associated with a respective range of scheduling rates; and wherein each of said schedule entries corresponds to an action of forwarding of a packet by the particular machine, and the approximated finish delay of each particular speed group of the plurality of speed groups is determined based on a largest packet size and a rate within said range of scheduling rates of said particular speed group; and
wherein the rate is the slowest of the boundary rates of said range of scheduling rates of said particular speed group.

31. The method of claim 30, comprising: (c) initiating an action corresponding to the approximated earliest finishing entry in response to said identifying the approximated earliest finishing entry.

32. The method of claim 28, comprising: (c) initiating an action corresponding to the approximated earliest finishing entry in response to said identifying the approximated earliest finishing entry.

33. The method of claim 29, comprising: (c) initiating an action corresponding to the approximated earliest finishing entry in response to said identifying the approximated earliest finishing entry.

* * * * *

UNITED STATES PATENT AND TRADEMARK OFFICE
CERTIFICATE OF CORRECTION

PATENT NO. : 7,599,381 B2 Page 1 of 1
APPLICATION NO. : 11/022220
DATED : October 6, 2009
INVENTOR(S) : Shoham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1057 days.

Signed and Sealed this

Twenty-eighth Day of September, 2010

David J. Kappos
*Director of the United States Patent and Trademark Office*